T. M. EVANS.
METHOD OF AND APPARATUS FOR MAKING TERNE PLATES.
APPLICATION FILED JULY 8, 1916.
1,213,851.
Patented Jan. 30, 1917.
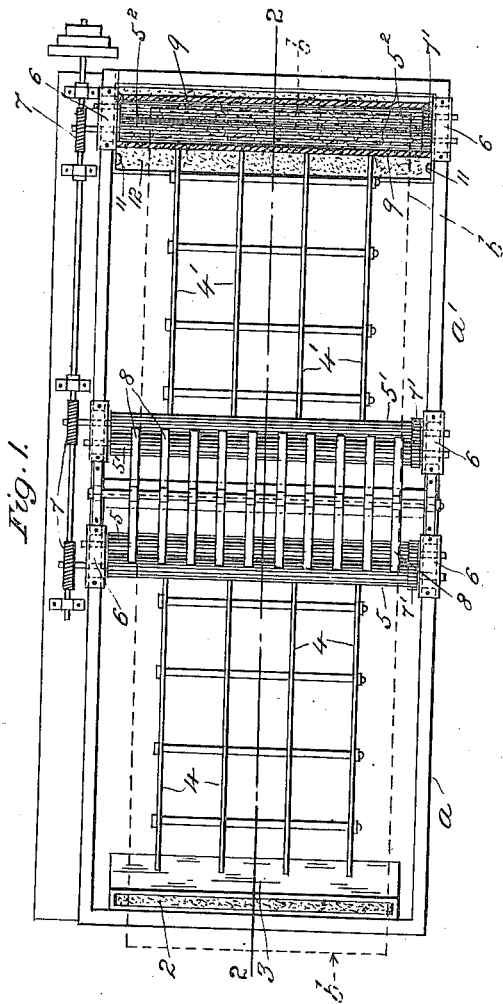
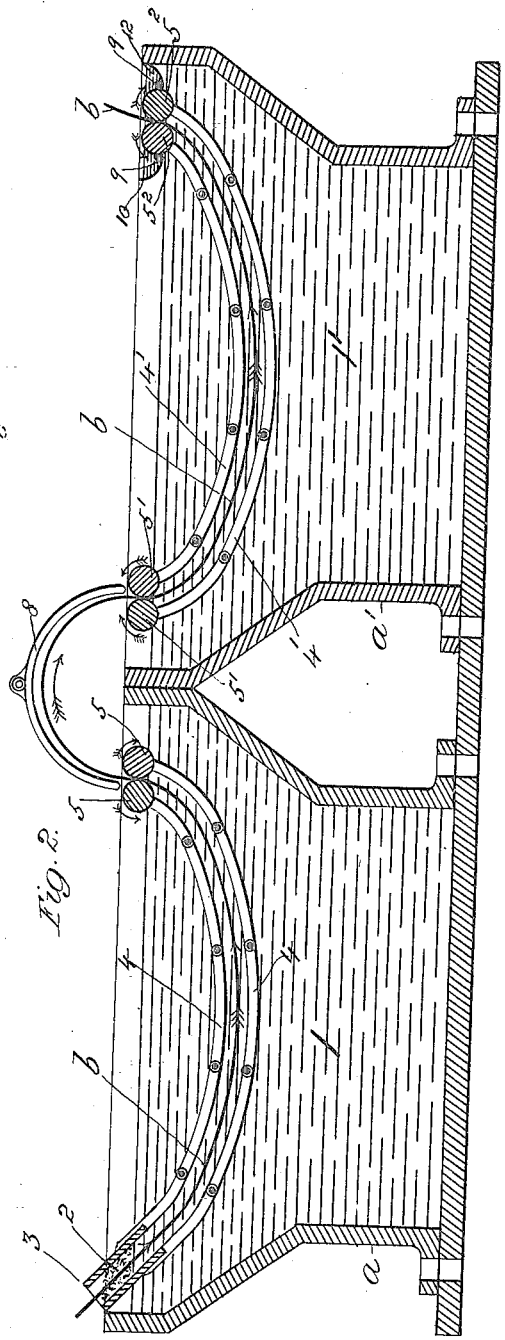
WITNESSES
Michael Sweeney
Edward F. Leeson
INVENTOR
Thomas M. Evans
By Edward W. Furrell
Atty

UNITED STATES PATENT OFFICE.

THOMAS M. EVANS, OF GRANITE CITY, ILLINOIS.

METHOD OF AND APPARATUS FOR MAKING TERNE PLATES.

1,213,851.  Specification of Letters Patent.  Patented Jan. 30, 1917.

Application filed July 8, 1916. Serial No. 108,226.

*To all whom it may concern:*

Be it known that I, THOMAS M. EVANS, a subject of the King of Great Britain, residing at Granite City, in the county of Madison and State of Illinois, have invented a new and useful Improved Method of and Apparatus for Making Terne Plates, of which the following is a specification.

My invention relates to an improved method of, and means for making terneplates.

According to the ordinary method of making a terneplate the iron or steel sheet to be coated, after being prepared for the purpose in the usual manner, is passed through a suitable flux or composition, into the terne or mixture of lead and tin in the proportions of from 75% to 80% of lead to from 15% to 20% of tin, and the sheet thus coated is then passed between two rollers which are horizontally mounted and rotated by suitable gearing within the pot containing the terne and flux. These rollers, being immersed in oil, the terneplate when it leaves the rollers and pot, owing to the oil and flux being more or less mixed with the terne thereon, is dull and discolored in spots, which renders it necessary to subsequently clean the terneplate by passing it through a branning machine, or otherwise cleaning, which is costly and laborious.

My invention has for its object to dispense with the oil and effect a thorough cleaning of the terneplate in its passage through the apparatus without the subsequent cleaning as aforesaid, and to produce a terneplate of a higher grade with a less percentage of tin than by the ordinary method.

My improved method consists in passing the iron or steel sheet to be coated, after being prepared for the purpose in the usual manner, through a suitable flux or composition, into the terne or mixture of lead and tin in the proportions of 95% of lead to 5% of tin, or thereabout, and the sheet thus primarily coated is then passed between two rollers which are horizontally mounted and rotated by suitable gearing within a pot containing the terne and flux, but without the oil used in the ordinary method as above described. The sheet is then passed between a second pair of rollers similarly mounted and rotated in a second adjacent pot, and from these rollers into the terne contained in the second pot, by which the coating of the sheet is completed. The terneplate is then finally passed between a third pair of rollers similarly mounted and rotated in the second pot, this third pair of rollers revolving circumferentially against a packing or surface of asbestos extending the entire length of the rollers and held preferably, in a box or trough containing rosin (or analogous substance) which is more or less absorbed by the asbestos, and in which the third pair of rollers are immersed. This box or trough is secured at the ends in any suitable manner to the walls of the second pot in proximity to the surface of the terne therein, it being here noted that, the temperature of the terne within the second pot is preferably, maintained at a temperature of one-half, or thereabout, of the temperature of the terne within the pot containing the first set of rollers.

By my improved method, owing principally to the action of the asbestos packing pressing against the third pair of rollers combined with the difference in temperature of the terne within the first and second pots, the terneplate is delivered from the third pair of rollers thoroughly clean and bright without the use of oil, and without having to pass it subsequently through a branning machine or other cleaning operation, and furthermore, the proportion of tin to lead in the terne solution is greatly reduced from that of the old method, and a terneplate of higher grade produced.

On the accompanying drawing forming part of this specification, Figure 1, is a top plan view of a form of apparatus which I may use in carrying out my invention, and Fig. 2, a vertical longitudinal section to enlarged scale, through the same on line 2, 2, in Fig. 1.

Like letters and numerals of reference denote like parts in all the figures.

*a* represents a pot containing the terne or solution of lead and tin 1, and a suitable flux or composition 2 which is held in a rectangular-shaped tubular frame 3 located at one end of the pot *a* and forming an opening through which the iron or steel sheet *b* (shown by dotted lines in Fig. 1 and by the heavy full line in Fig. 2) to be coated is inserted through the flux 2 into the terne 1, and thence passing between curved guides 4, is drawn by, and passes between two rollers 5 which are mounted horizontally in bearings 6 (or other suitable bearings) within and near the top of the pot $a$ at its other end, and rotated in the directions indicated by the arrows in Fig. 2, by any suitable gearing, such as 7 and 7' shown, whereby the sheet $b$ primarily coated with the terne in the pot $a$ passes upward from the latter and is directed by the curved guides 8 downward between a second pair of rollers 5'. These rollers are similarly mounted and adjacent to the first pair of rollers 5, within a second adjoining pot $a'$ containing terne 1', through which the sheet $b$ passes between curved guides 4' to, and between a third pair of rollers $5^2$, similarly mounted to the first and second pair of rollers 5, 5', within the pot $a'$ at its opposite end, the periphery of each roller $5^2$ revolving against a rope or packing 9 composed of asbestos and extending the entire length of the rollers $5^2$, the packing 9 being held at the bottom of a box or trough 10 which is secured at its ends to the walls of the pot $a'$ by screws 11, or in any other suitable manner. The box or trough 10 contains rosin 12 (or analogous substance) which is absorbed more or less by the packing 9 and in which the rollers $5^2$ are immersed. By this means the terneplate $b$ on passing from the rollers $5^2$ is thoroughly cleaned without the necessity of subsequently passing it through a branning machine or other cleaning process as when made by the ordinary method.

The terneplate $b$ in the present case is shown as extending the entire distance between its insertion at one end of the pot $a$ to its delivery at the other end of the second pot $a'$, but may be of any other length as desired.

Claims:

1. The herein described method of making a terneplate, consisting in passing a metallic sheet through a suitable flux into terne, then passing the sheet between two pairs of rotating rollers into another body of terne, having a different temperature than that of the first named terne and then finally passing the sheet between a third pair of rotating rollers which are peripherally coated with a resinous substance.

2. The herein described method of making a terneplate, consisting in passing a metallic sheet through a suitable flux into terne of a predetermined temperature, then passing the sheet between two pairs of rotating rollers into another body of terne having a lower temperature than that of the first named terne, and then finally passing the sheet between a third pair of rotating rollers which are peripherally coated with a resinous substance.

3. In apparatus of the character described, the combination of a pot adapted to contain terne, a pair of rollers mounted side by side within the said pot, guides for directing material to be coated from the outside of the said pot, through the terne therein, to the said rollers, a second pot adapted to contain the terne, a second pair of rollers mounted side by side within the second pot, guides for directing the said material from the first to the second pair of rollers, a third pair of rollers mounted side by side within the second pot, guides for directing the said material from the second pair of rollers through the terne within the second pot to the third pair of rollers, a non-combustible packing, a receptacle for a resinous substance adapted to hold the said packing against the periphery of each of the last named rollers, and means for rotating the said rollers, substantially as described.

THOMAS M. EVANS.

Witnesses:
 EDWARD W. FURRELL,
 MICHAEL SWEENEY.